United States Patent [19]

Dale

[11] 4,176,495

[45] Dec. 4, 1979

[54] APPARATUS AND METHOD FOR AUTOMATED INJECTION OF TREES WITH A TREATING LIQUID

[75] Inventor: Warren H. Dale, Hattiesburg, Miss.

[73] Assignee: Hercules Incorporated, Wilmington, Del.

[21] Appl. No.: 930,473

[22] Filed: Aug. 2, 1978

[51] Int. Cl.$^2$ ............................................. A01G 29/00
[52] U.S. Cl. .......................................... 47/57.5; 47/10
[58] Field of Search ....................... 47/57.5, 10; 111/6; 118/35

[56] References Cited

U.S. PATENT DOCUMENTS

| | | | |
|---|---|---|---|
| 76,188 | 3/1868 | Heath | 175/318 |
| 2,348,874 | 5/1944 | Andreasson | 408/57 |
| 2,811,875 | 11/1957 | Cogsdill | 76/108 T |
| 2,912,887 | 11/1959 | Andreasson | 408/57 |
| 3,040,605 | 6/1962 | Andreasson | 408/59 |
| 3,073,189 | 1/1963 | Paige | 408/59 |
| 3,295,254 | 1/1967 | Schoonman | 47/57.5 |
| 3,640,234 | 2/1972 | Carroll et al. | 111/6 |
| 3,832,803 | 9/1974 | Blake et al. | 47/57.5 |
| 3,834,075 | 9/1974 | Nix et al. | 47/57.5 |
| 3,968,594 | 7/1976 | Kawakami | 47/57.5 |
| 3,971,159 | 7/1976 | Brown et al. | 47/10 |
| 4,011,685 | 3/1977 | Boyd et al. | 47/57.5 |
| 4,029,134 | 6/1977 | Cook et al. | 144/208 C |
| 4,048,353 | 9/1977 | Stewart et al. | 427/291 |
| 4,103,456 | 8/1978 | Hendrixson | 47/57.5 |

Primary Examiner—Robert E. Bagwill
Attorney, Agent, or Firm—Joshua W. Martin, III

[57] ABSTRACT

Apparatus and method for drilling a borehole into the sapwood of a tree and injecting a chemical solution into the borehole, preferably during withdrawal of the drill bit, including facilities for supplying a liquid through a passageway within the bit and facilities for injecting a quantity of liquid, proportional to the volume of the borehole and allocated simultaneously with and in response to progression of the drill bit, into the borehole as the drill bit is being withdrawn therefrom.

18 Claims, 5 Drawing Figures

APPARATUS AND METHOD FOR AUTOMATED INJECTION OF TREES WITH A TREATING LIQUID

BACKGROUND OF THE INVENTION

1. Field of the Invention

This invention relates to method and apparatus for drilling a borehole into the sapwood of a tree and injecting a chemical solution into the borehole. This invention relates particularly to mobile apparatus for injecting a quantity of solution proportional to the volume of the borehole into a growing pine tree immediately after a borehole is formed therein, to chemically induce the formation of lightwood, rich in oleoresin content.

2. Description of the Prior Art

It has long been known in the art that trees may be injected with appropriate liquids, for example, to supply nutrients to the tree or treat the tree for disease. A number of approaches have been disclosed for preparing a treatment site through the bark of a tree trunk. For example, treatment sites have been prepared by removing a small section of bark to expose sapwood; or by boring a small downwardly sloping hole into the sapwood. Application of a solution of treating chemical to the above treatment sites is made by any convenient means, such as, for example, by use of a sprayer or a brush. With regard to the treatment site prepared by boring a downwardly sloping hole into the sapwood, the solution is applied by pouring it into the hole.

Another method of treatment site preparation comprises providing on the sapwood of a living conifer anywhere from ground level to a height of about 10 ft. above ground level at least one elongated, downwardly sloping hole and subsequently inserting into the hole an absorbent fibrous material for receipt of a treating chemical. The treating chemical will usually be applied in the form of a solution thereof in a suitable solvent, water preferably. The absorbent fibrous material functions as a wick and provides for movement of the solution of treating chemical into the conifer. If desired, the treating chemical, alone or in solution, can be applied to the absorbent fibrous material prior to insertion of the fibrous material into the prepared hole. This method of treatment site preparation is disclosed in U.S. Pat. No. 3,971,159 of July 27, 1976, reference to which is hereby made.

The prior art also discloses another two-step operation wherein a borehole must first be drilled a suitable depth into the tree trunk, after which a nozzle is inserted in the borehole and attached to the tree in a leak-proof manner. In such prior devices, the borehole is of a slightly larger diameter than the nozzle in order that fluid emitted from the nozzle may fill the borehole, thereby obtaining a maximum area for absorption of the liquid by the capillary system of the tree. The making of a leak-proof connection between the nozzle and the borehole frequently resulted in air being trapped in the borehole about the nozzle. Such trapped air is objectionable because it tends to close the pores and passageways in the substance of the tree and to retard and delay the proper diffusion and transfer of the liquid from the point of introduction to remote parts of the tree.

A modification of the aforementioned approach required that the diameter of the initial hole drilled into the trunk would be slightly smaller than the outer diameter of the threaded nozzle tip. A second hole or counterbore having a diameter substantially equal to the nozzle head or sealing ring (if provided) would then be added to insure that when the output orifices in the nozzle shank reached the sapwood, the nozzle would be sealed. The counterbore facilitated sealing by enabling a sealing ring of the inwardly directed nozzle head surface portion to firmly seat against the wood. Following the drilling operation, the hole would be cleaned out in order to insure that the nozzle output orifices could reach the sapwood and that the nozzle head would be adequately sealed without interference from loose wood particles. In many instances, it was necessary to hammer the treatment head into the hole to insure a proper fit for the pressurized injection process thereby often damaging the treatment head, as well as being a time consuming task.

The chemical applicator nozzle disclosed in U.S. Pat. No. 3,968,594 includes a socket and an integral tapered shank portion having output orifices at its tip. The taper of the shank, together with exterior threads provided thereon, facilitates self-tapping and self-sealing of the nozzle. In this apparatus, the threads of the nozzle shank, rather than the inwardly directed surface of the nozzle head or separate sealing ring, provides the sealing. This reference also discloses a method including two separate operations wherein initially a hole is drilled into the sapwood and then a nozzle is inserted therein. Pressurized chemicals are then applied through the nozzle into the sapwood. This method also requires that the nozzle threadably engage the outer surface of the tree.

SUMMARY OF THE INVENTION

This invention relates to apparatus and method for injecting liquid into a tree using a drill bit, having a fluid passageway therethrough. The mobile apparatus includes the drill bit, facilities for rotating and reversibly advancing the drill bit to form a borehole in a tree, facilities for supplying a quantity of liquid substantially proportional to the volume of the borehole through the passageway within the drill bit, and facilities for injecting the liquid allocated simultaneously with, and in response to, progression of the drill bit, into the borehole as the drill bit is being withdrawn therefrom.

The method includes drilling a borehole into a tree while simultaneously allocating, in response to progression of the drilling, an amount of liquid proportional to the volume of the borehole and injecting the allocated amount of liquid into the borehole during withdrawal of the drilling device.

The inventive apparatus and method provide a highly efficient approach for the chemical treatment of trees. The amount of substantially void-free liquid injected into the borehole is proportional to the volume of the hole, thereby minimizing waste and overflow onto the bark of the tree. Also, the apparatus can be easily moved from tree to tree, thereby providing for expeditious treatment of a large number of trees in a short period of time.

DESCRIPTION OF THE INVENTION

Figure 1:
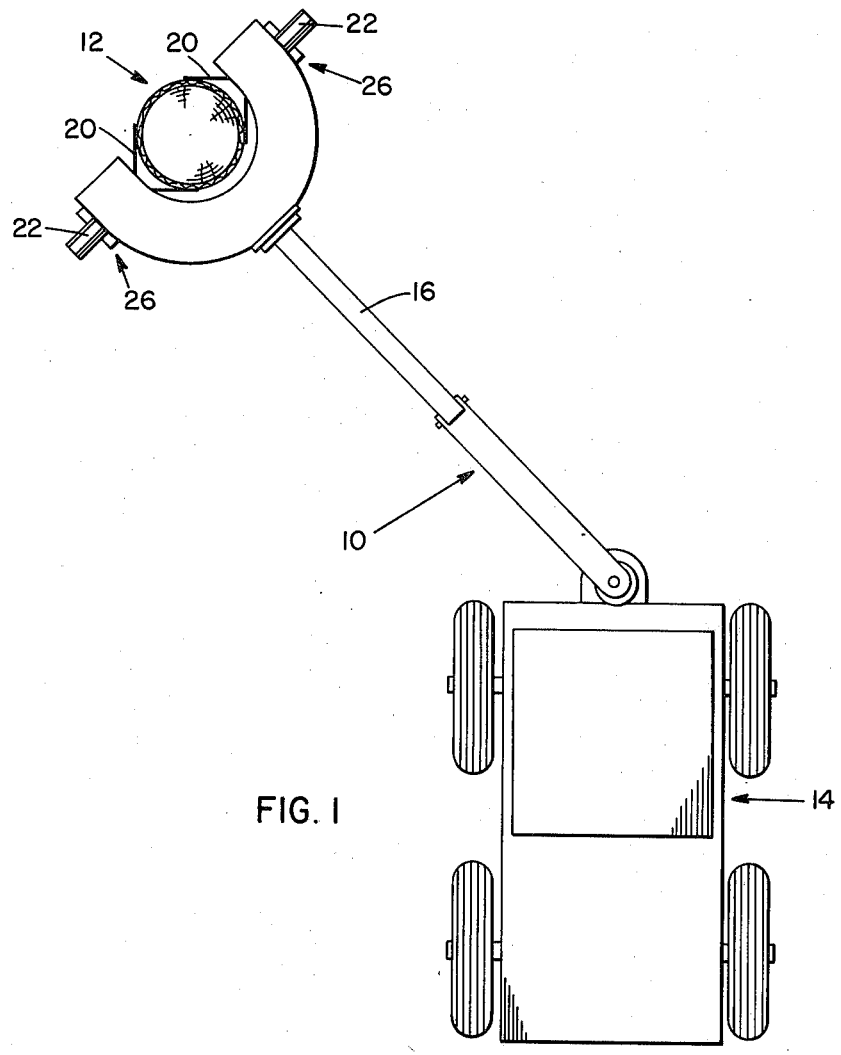
FIG. 1 is a top plan view of mobile apparatus employing the subject matter of this invention.
Figure 2:
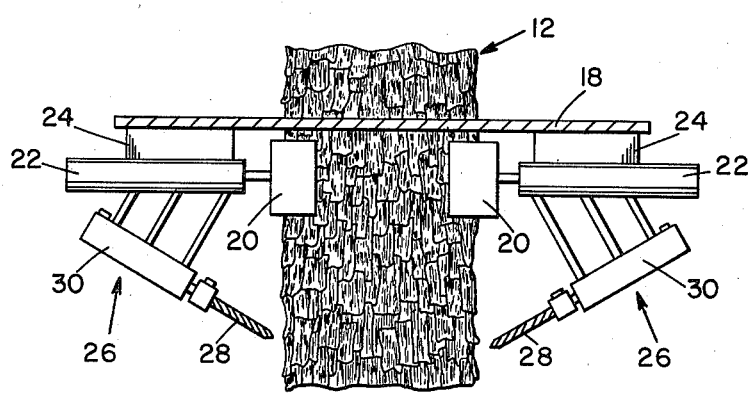
FIG. 2 is a side elevational view of a portion of the apparatus of FIG. 1 in position around a tree trunk.

Referring now to the drawings, as shown in FIG. 1, a preferred embodiment of the tree injection apparatus 10 of this invention is shown positioned around a tree 12, for application of a chemical treating solution. The tree injection apparatus includes a mobile unit 14 which may be an all-terrain skid-steer vehicle. The mobile unit moves to a position adjacent to the trunk of tree 12. An hydraulic knuckle boom 16 is mounted on the front of mobile unit 14 and is adapted to swing in a horizontal and vertical plane. Alternatively, a straight boom, adapted to only swing in a substantially horizontal plane could be substituted for knuckle boom 16. In the embodiment of FIG. 1, a semi-circular mounting plate 18 is attached to the front end of hydraulic boom 16. A pair of V-shaped tree centering clamps 20 are pivotally mounted onto mounting plate 18. Centering clamps 20 are attached to centering clamp cylinders 22 which are positioned on mounting plate 18 by clamp mounts 24, as shown in FIG. 2.

In this embodiment, two injector assemblies 26 are mounted to clamp cylinders 22 which are attached to plate 18 around the periphery of tree 12. Each injector assembly 26 has hollow stem drill bit 28 protruding from housing 30 and downwardly disposed toward the trunk of tree 12.

Figure 3:
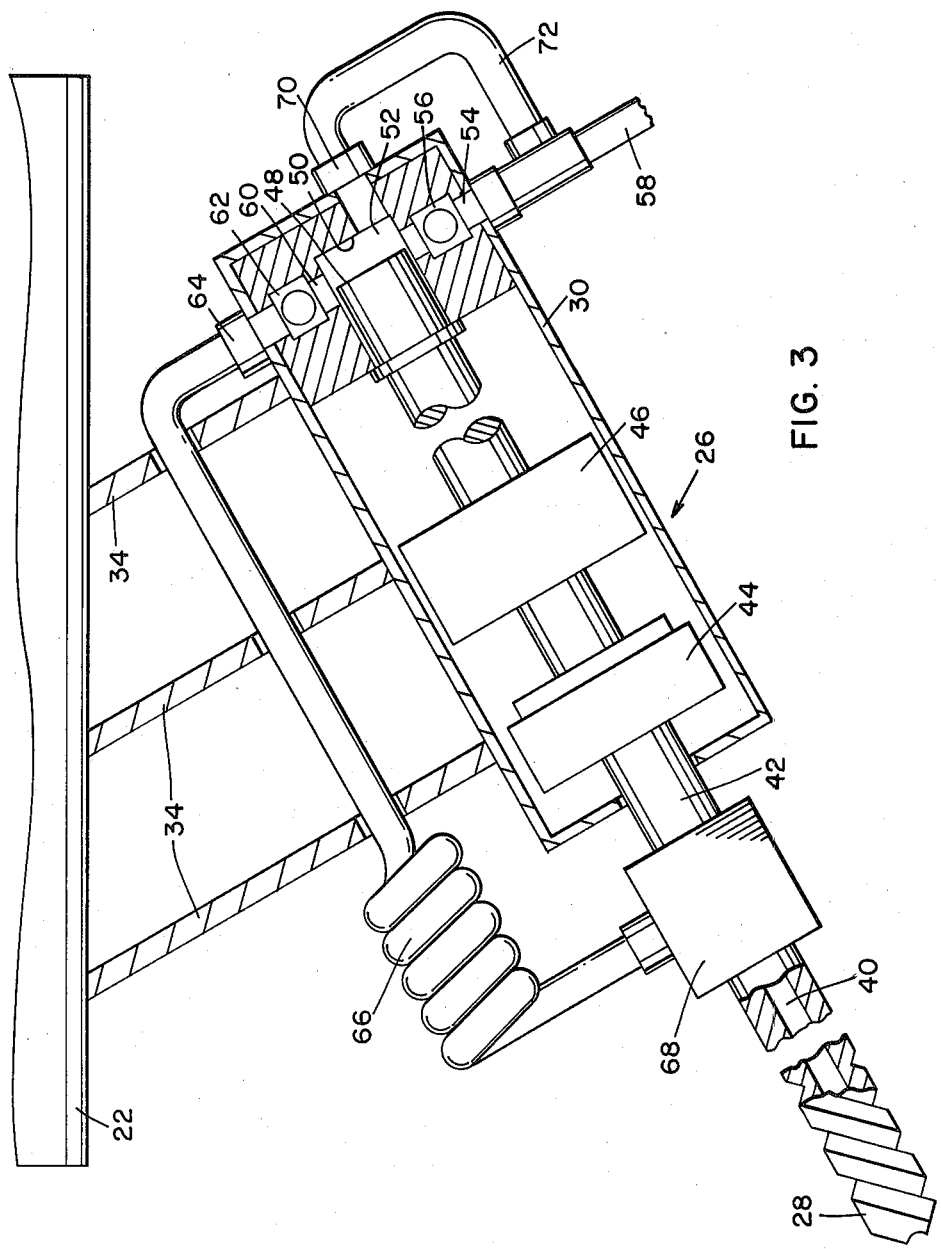
FIG. 3 is a detailed side elevational view of the injector assembly of this invention.

As shown in FIG. 3, injector assembly 26 is attached to clamp cylinder 22 by adjustable mounting members 34. Hollow stem drill bit 28, having annular passageway 40, is attached to drill shaft 42 which extends into housing 30. Hollow stem drill bit 28 is preferably made from a high strength material and should have a relatively large chip clearance. Drill bit 28, which is similar to the type well known in the art for supplying lubricant or a cooling medium during drilling, will remove some chips during drilling. Any remaining chips will be removed during drill bit reversal and retraction, ahead of the ejected stream of treating liquid initially emerging from drill bit 28 at the bottom of the borehole.

In this preferred embodiment, rotary motion is imparted to drill shaft 42 by hydraulic motor 44. Associated with hydraulic motor 44 is a rotary driving pump and oil reservoir which is not shown in FIG. 3. Although an hydraulic motor provides an efficient source of power for rotary motion in the field, an electric motor or other power source well known in the art could be used. Since hydraulic motor 44 is attached to drill shaft 42, it will move toward the borehole during drilling.

An hydraulic piston 46 is used to impart translational motion to drill shaft 42, and also to provide proportioning action for filling a pump cavity containing the treating liquid. Fluid from an hydraulic pump (not shown) provides displacement of the drill shaft 42 toward and away from the borehole. Although in this preferred embodiment, an hydraulic piston is used, alternatively, any power source known in the art can be substituted to provide the translational motion.

Drill shaft 42 extends further through housing 30 into pump head 47 which is of the well known piston pump design. Before drilling commences, the rear end 48 of drill shaft 42 extends toward the closed end 50 of pump head cavity 52. In this embodiment, conduit 54, containing spring valve mechanism 56, opens into pump head cavity 52 near its closed end 50. Conduit 54 also passes through housing 30 and has attached thereto hose 58 which terminates at a reservoir (not shown) which contains the tree treating liquid for application to a tree. Conduit 60, containing spring valve mechanism 62, opens into pump head cavity 52 at a position opposite to the termination of conduit 54 near the closed end 50 of pump head cavity 52. Conduit 60 passes through housing 30 and has attached thereto at fitting 64, flexible conduit 66 which extends along housing 30 toward drill bit 28. Flexible conduit 66 terminates forward of housing 30 at hollow stem drill unit 68 in communication with annular passageway 40. Drill unit 68 contains ring seals which allow it to ride rotating drill shaft 42 without rotating itself. A suitable hollow stem drill unit, which has been used in the cleaning of boiler tubes, is made by Thomas C. Wilson Co., of Long Island City, N.Y. Since flexible conduit 66 is in communication with annular passageway 40, liquid can flow from conduit 66 through passageway 40 of drill bit 28 while drill shaft 42 is rotating.

In operation, the fluid reservoir, connected to pump head cavity 52 through conduit 58, is under pressure. This pressure forces spring valve mechanism 56 open, allowing pump head cavity 52 to fill with tree treating liquid as drill shaft 42 is positively displaced out of cavity 52 in response to translational motion supplied by hydraulic piston 46. Spring valve mechanism 62 is held in a closed position, preferably by a spring valve mechanism, although a sliding valve or another type of valve mechanism would be applicable. The length of travel of drill shaft end 48 within pump head cavity 52 is proportional to the length of travel, i.e., positive displacement, of drill bit 28, as it drills a borehole into a tree. The dimensions of pump head cavity 52 are such that the volume of treating liquid pumped into cavity 52 from the reservoir is substantially proportional to the volume of the borehole made by drill bit 28. Therefore, when drill bit 28 reaches the end of its forward travel, i.e., upon completion of drilling, there is a volume of treating liquid in pump cavity 52 substantially proportional to the volume of the borehole. This allocated or predetermined quantity of treating liquid is then ready for injection into the borehole.

As drill bit 28 commences its retraction, spring valve mechanism 62 is automatically opened, spring valve mechanism 56 is closed and the reverse motion of drill shaft 42 forces the tree treating liquid from pump cavity 52 through conduit 60, spring valve mechanism 62 and flexible conduit 66 into drill unit 68. Preferably, fluid will exactly fill the bored hole in tree 12 as drill bit 28 is retracted because of the equal displacement of fluid from pump head cavity 52 by piston 46. Pumping of fluid will be stopped during retraction when drill bit 28 nears the opening of the bored hole on the surface of tree 12. Valve 70 will be opened in line 72 from pump head cavity 52 to allow fluid to by-pass spring valve mechanism 56 and conduit 54 and flow into base 58. Preferably, valve 70 is an electrically operated solenoid valve which can be actuated by a switch attached to and actuated by the position of drill shaft 42. After drill bit 28 is completely retracted, the injection apparatus can be moved to another location on the same tree or to another tree.

Once the treating chemical has been applied, it is preferred that the hole be sealed or closed to prevent loss of treating chemical and also to help protect the living conifer from infestation by insects, fungus, and the like. The hole can be sealed or closed by any suitable means and is within the skill of the art. Thus, for example, the hole can be closed by plugging with a cork, wooden plug, a plastic plug, or a rubber plug. In addition, the hole can be sealed by use of a sealant such as wax.

Chemicals used to induce oleoresin deposition are a class of substituted bipyridylium (bipyridinium) salts (see U.S. Pat. No. 3,839,823). Examples of such treating chemicals are

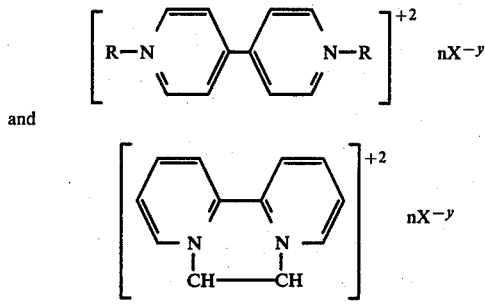

and where n=1 or 2, y=1 or 2, and n×y=2, and R=$CH_3$, $CH_3CH_2$—, $CH_3CH_2CH_2$—,

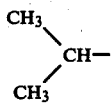

and higher aliphatic alkyl groups, either straight chain or branched, and x is any anion that makes the compound water soluble, such as, but not limited to, the following:

| | |
|---|---|
| Cl$^-$ | (chloride) |
| Br$^-$ | (bromide) |
| F$^-$ | (fluoride) |
| I$^-$ | (iodide) |
| SO$_4^-$ | (sulfate) |
| NO$_3^-$ | (nitrate) |
| OH$^-$ | (hydroxyl) |
| CH$_3$SO$_4^-$ | (methyl sulfate) |

The aqueous solution of treating chemical is absorbed into the ray cells and the vertical cells resulting in the production of oleoresin.

The solution is made by dissolving a predetermined amount of the treating chemical in water. Since some of the chemicals are commercially available as aqueous solutions, the only preparation may involve further dilution by the addition of water.

Once applied in the form of an aqueous solution, the chemical is mobile and may be carried to distant areas within the living conifer. The chemical continues to induce oleoresin production wherever it is located.

Figure 4:
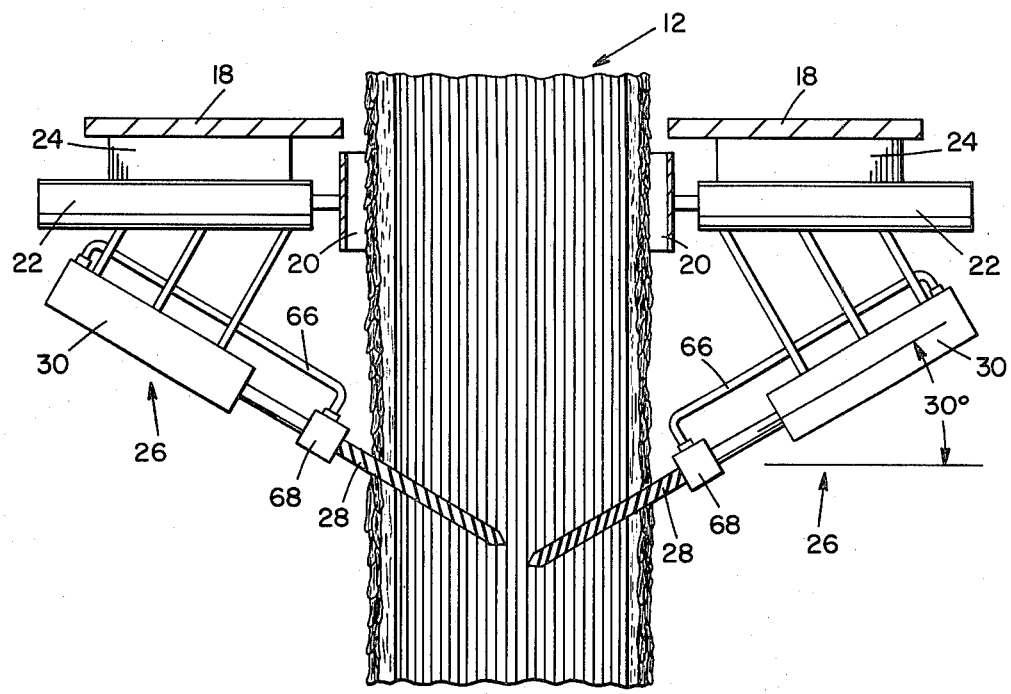
FIG. 4 is a side view of two injector assemblies, showing the approximate manner in which the drill bits form downwardly sloping boreholes for deposition of the treating liquid.
Figure 5:
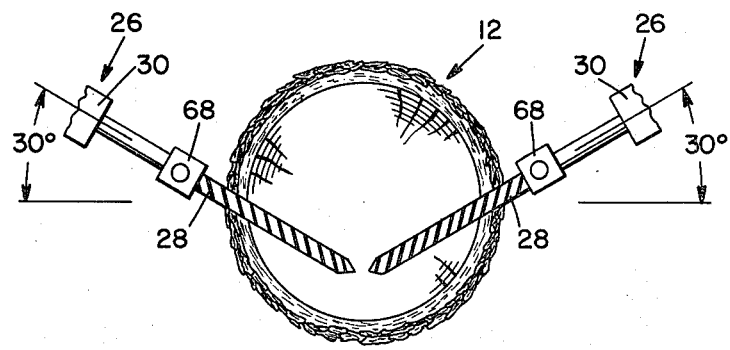
FIG. 5 is a horizontal section taken along a tree showing two injector assemblies, both disposed at an angle from the centerline in a horizontal plane of the tree.

In one embodiment of this invention, two diametrically opposed injection devices 26 can be used as shown in FIG. 2. The drills should enter the tree trunk with a 5°–45° downward inclination, preferably about 30° plane, as shown in FIG. 4. Preferably each injection assembly 26 should be displaced about 1 to 2 inches vertically from each other to preclude contact near the end of travel of each respective drill bit 28. In addition, preferably each drill bit 28 should be skewed approximately 20°–45° laterally to the same side of a line running through the axis of the tree, in a substantially horizontal plane, as shown in FIG. 5. This angle preferably should be about 30°. This horizontal offset is used, so that the interior portion of the tree, i.e., heartwood 70, will not be affected by the treating solution. Since this interior column is dead, there are no transpiration streams to provide any movement of the treating solution through the tree.

The cross-sectional diameter of the drilled borehole should have a diameter of about ¼ inch to about 1 inch and preferably from about ⅜ inch to about ⅝ inch. The axes of drilling for both drills preferably should extend on one side of the center of the tree, as shown in FIG. 5. Facilities for controlling the depth of penetration or for sensing when the ends of each drill have reached a predetermined point should be provided. One embodiment of such means is a mechanical device, mounted on the non-rotating portion of injector assembly 26, which would move forward, i.e., in the direction of drilling. Suitably calibrated, this sensor can activate a switch whenever it reaches a position proportional to the center line of mounting plate 18.

This injection process will provide treatment for approximately 50% of the active area of the tree along cross-sections of the tree near the injections. It is an important requirement that approximately 50% of the tree be left unimpregnated by the treating solution so that nutrients which have to travel through the tree will have a passageway for maintenance of life in the tree.

Although the process described in the preferred embodiment of this invention uses two injector assemblies, conceivably, a plurality of injector assemblies could be used simultaneously. In addition, drilling could proceed sequentially.

While the above description has been directed to the use of this invention for injecting specific treating chemicals that will induce oleoresin deposition in a conifer, it is to be understood that the invention can be used for injecting other treating chemicals that will induce oleoresin deposition. Also, the invention can be used, if desired, for the injection of other treating chemicals, such as, for example, systemic insecticides. Furthermore, it will be more desirable and efficient in some cases to use a single injector assembly with the apparatus of this invention, which will drill a single borehole in each tree.

It is to be understood that the above description and drawings are illustrative of this invention and not in limitation thereof. As will be evident to those skilled in the art, various modifications can be made in light of the foregoing disclosure and discussion, without departure from the spirit or scope of the disclosure or from the scope of the claims.

What I claim and desire to protect by Letters Patent is:

1. Apparatus for injecting liquid into a tree comprising:
    at least one drill bit having a fluid passageway therethrough;
    means for rotating and reversibly advancing said drill bit to form a borehole in said tree;
    means in communication with said drill bit for supplying a quantity of liquid substantially proportional to the volume of said borehole through said passageway and injecting said liquid into said borehole.

2. The apparatus of claim 1 wherein said rotating and reversibly advancing means includes a drill shaft attached to said drill bit and means for controlling the depth of penetration of said drill bit.

3. The apparatus of claim 1 wherein said supplying and injecting means includes a reservoir for storage of said liquid, a pump which receives said liquid in an amount substantially proportional to the positive displacement of said drill shaft and upon retraction of said drill shaft forces said liquid through a conduit and into said drill bit.

4. The apparatus of claim 1 including means for positioning each of said drill bits wherein said positioning means includes at least one member which engages the trunk of said tree.

5. The apparatus of claim 1 wherein each of said drill bits is downwardly disposed toward the trunk of said tree.

6. The apparatus of claim 1 including mobile means for moving said apparatus from tree to tree and for adjusting the position of said apparatus in relation to the size and position of the trunk of said tree.

7. Apparatus of claim 1, 2, 3, 4, 5 or 6 wherein said supply and injection means is actuated by and responsive to progression of said drill bit.

8. The apparatus of claim 1, 2, 3, 4, 5 or 6 wherein said supply and injection means includes means responsive to advancement of said drill bit for controlling the amount of liquid supplied.

9. The apparatus of claim 4 wherein said engaging member is a clamp, pivotally mounted on a mounting plate, and actuated by means for forcing said clamp against said tree to position each of said drill bits.

10. The apparatus of claim 1 wherein a plurality of drill bits is mounted on a plate which extends around at least a portion of the trunk of said tree.

11. The apparatus of claim 10 wherein said plate is substantially semi-circular, having a semi-circular opening therein for positioning around the trunk of said tree, said plate having a plurality of said drill bits mounted thereon with each drill bit downwardly disposed toward the trunk of said tree, and having a downward inclination of about 5°–45° from the horizontal.

12. The apparatus of claim 6 wherein said mobile means includes a vehicle having rotatably attached thereto a hydraulic boom for adjustment of the position of each of said drill bits.

13. The apparatus of claim 3 including means for positioning each of said drill bits around the periphery of a tree, wherein said positioning means includes at least one member which engages the trunk of said tree and mobile means for moving said apparatus from tree to tree and for adjusting the position of said apparatus in relation to the size and position of the trunk of said tree.

14. A method of applying a treating liquid to a tree comprising:
providing an apparatus including a drill bit having a passageway therethrough, means for positioning said drill bit adjacent a tree, means for rotating and reversibly advancing said drill bit to form a borehole in said tree, means in communication with said drill bit for supplying a liquid through said passageway and injecting a predetermined quantity of said treating liquid into said borehole;
drilling at least one borehole into the trunk of a tree;
allocating an amount of treating liquid substantially proportional to the volume of said borehole being drilled, while simultaneously drilling said borehole;
injecting said treating liquid through said passageway of said drill and into said borehole during retraction of said drill bit from said borehole.

15. A method of applying a treating liquid to a tree comprising:
drilling a borehole into the trunk of said tree with drilling means, while simultaneously
allocating, in response to the progression of said drilling, an amount of treating liquid substantially proportional to the volume of said borehole;
injecting said allocated amount of treating liquid into said borehole.

16. The method of claim 14 or 15 wherein the initiation of injection of said treating liquid occurs substantially simultaneously with the initiation of retraction of said drill bit from said borehole.

17. The method of claim 14 or 15 including drilling a downwardly sloping borehole into said tree, said drilling proceeding at a downward inclination of about 5°–45° from the horizontal.

18. The method of claim 14 or 15 wherein the injected liquid is an aqueous solution of substituted bipyridylium salt.

* * * * *